INVENTOR.
TENNY D. LODE
BY
ATTORNEY

INVENTOR.
TENNY D. LODE
BY [signature]
ATTORNEY

INVENTOR.
TENNY D. LODE
BY George W. Field
ATTORNEY

INVENTOR.
TENNY D. LODE
BY George W. Field
ATTORNEY

INVENTOR.
TENNY D. LODE

BY Gizel W. Field

ATTORNEY

United States Patent Office 3,033,453

Patented May 8, 1962

3,033,453

COMPUTERS

Tenny D. Lode, St. Paul, Minn., assignor to Minneapolis-Honeywell Regulator Company, Minneapolis, Minn., a corporation of Delaware Filed Dec. 2, 1957, Ser. No. 700,212
9 Claims. (Cl. 235—153)

Figure 1:
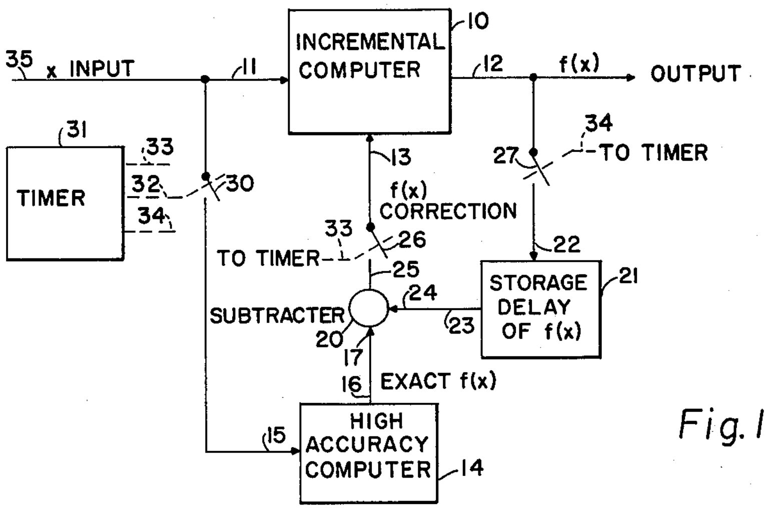

This invention relates to computers, and more specifically to periodic correction of a computer output.

In applications where the present value of a function of a variable is needed, it is apparent that the computation process used to determine the function of the variable must be very fast to minimize any resultant error due to time lag. The computation in this type of application is sometimes called real time computation, referring to the fact that the computed function of a changing variable actually represents the true value of the variable at that time. Real time computation, then implies very fast computation and, in the case of digital devices, relatively frequent sampling of the variable involved.

One method used in digital computers to obtain a function of a variable is to compute the sum of a series expansion chosen to represent the function. An expansion according to Maclaurin's series, for example, may be used to determine the value of a function to any desired accuracy. Computing a series, however, ordinarily involves many repetitive computations and requires, relatively, considerable time. For this reason it is not ordinarily thought of as a method that can be reconciled with real time requirements.

Another method of computation, namely incremental computation, is a scheme wherein the output, the computed function, is changed by suitable increments according to corresponding changes in the input, the changing variable. This method of computation requires relatively few steps between input and output and may be sufficiently fast to be correctly referred to as real time computation. An inherent drawback of incremental computation appears, unfortunately, when one considers that in incremental computation the output function is not completely computed over and over again, but rather the output function is merely modified in accordance with changes of the input variable. It is evident from this that small errors, due to either the approximations sometimes employed in incremental computation or due to actual errors occasionally arising out of faulty operation of the computer, or both, are cumulative. Thus, small errors, accumulated over a period of time, may become very serious.

While incremental computation is extremely fast, it is seen that its feature of accumulating errors is highly objectionable. On the other hand, while computation by a series expansion may be as accurate as is desired, its relatively slow speed usually precludes its use in real time applications.

Figure 5:
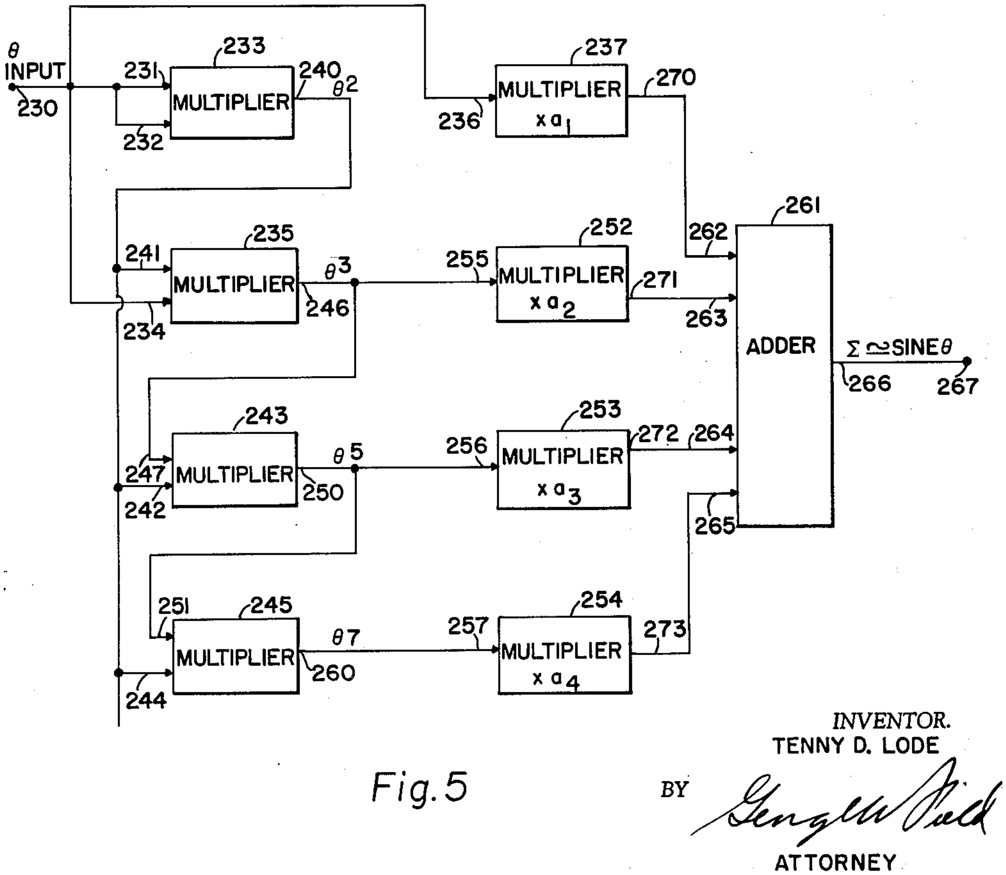
Figure 2:
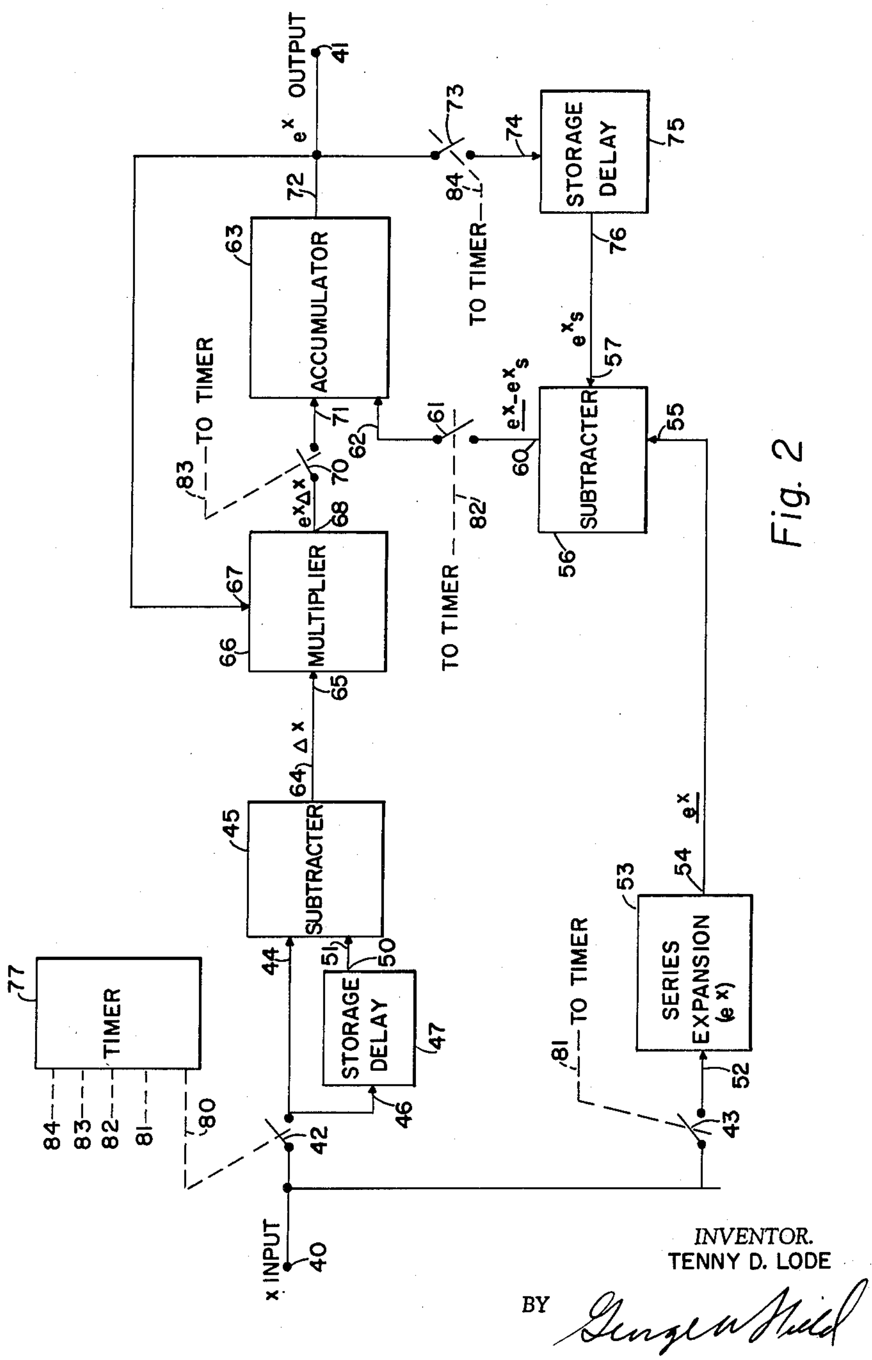
Figure 3:
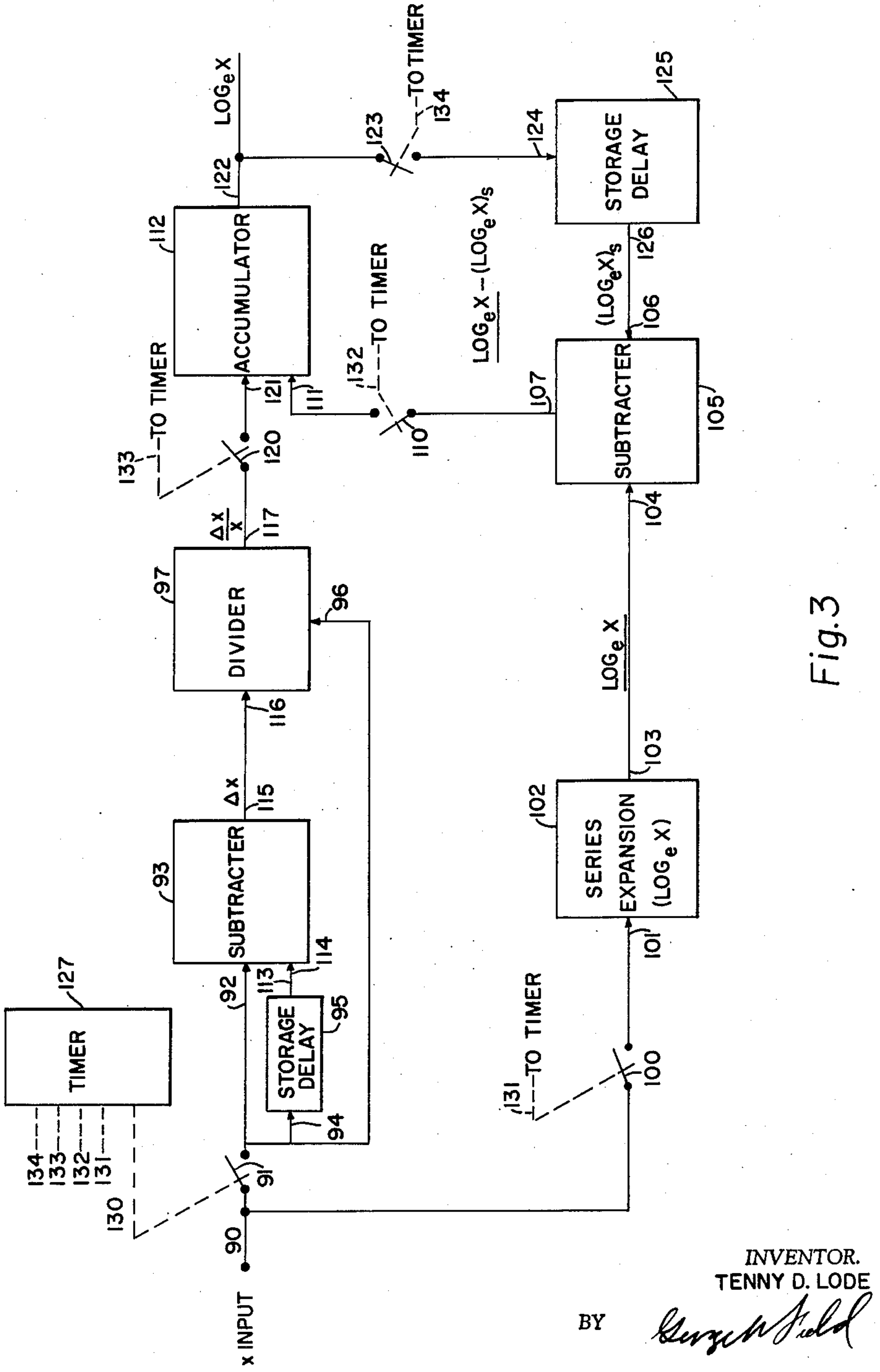
Figure 4:
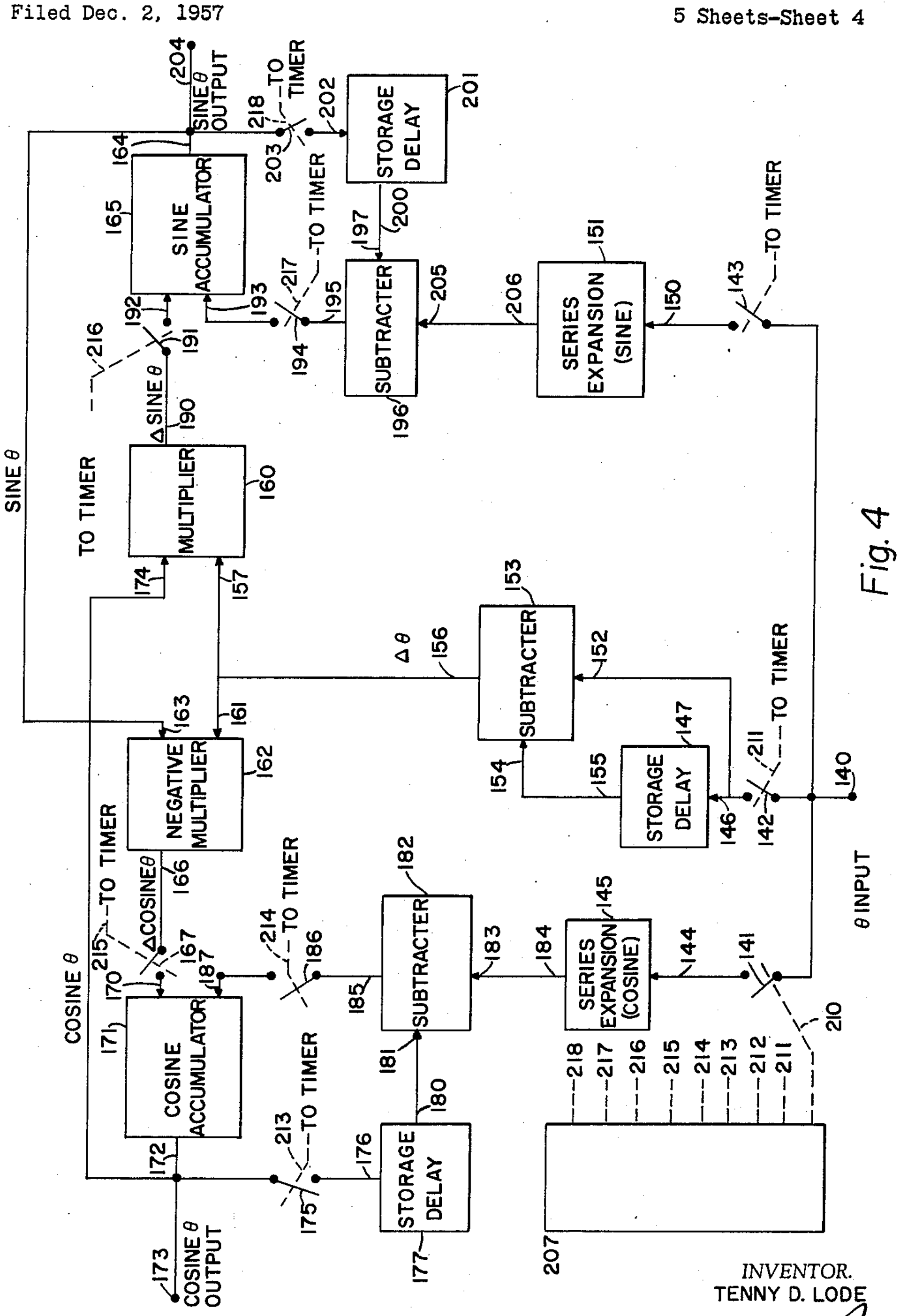
Figure 6:
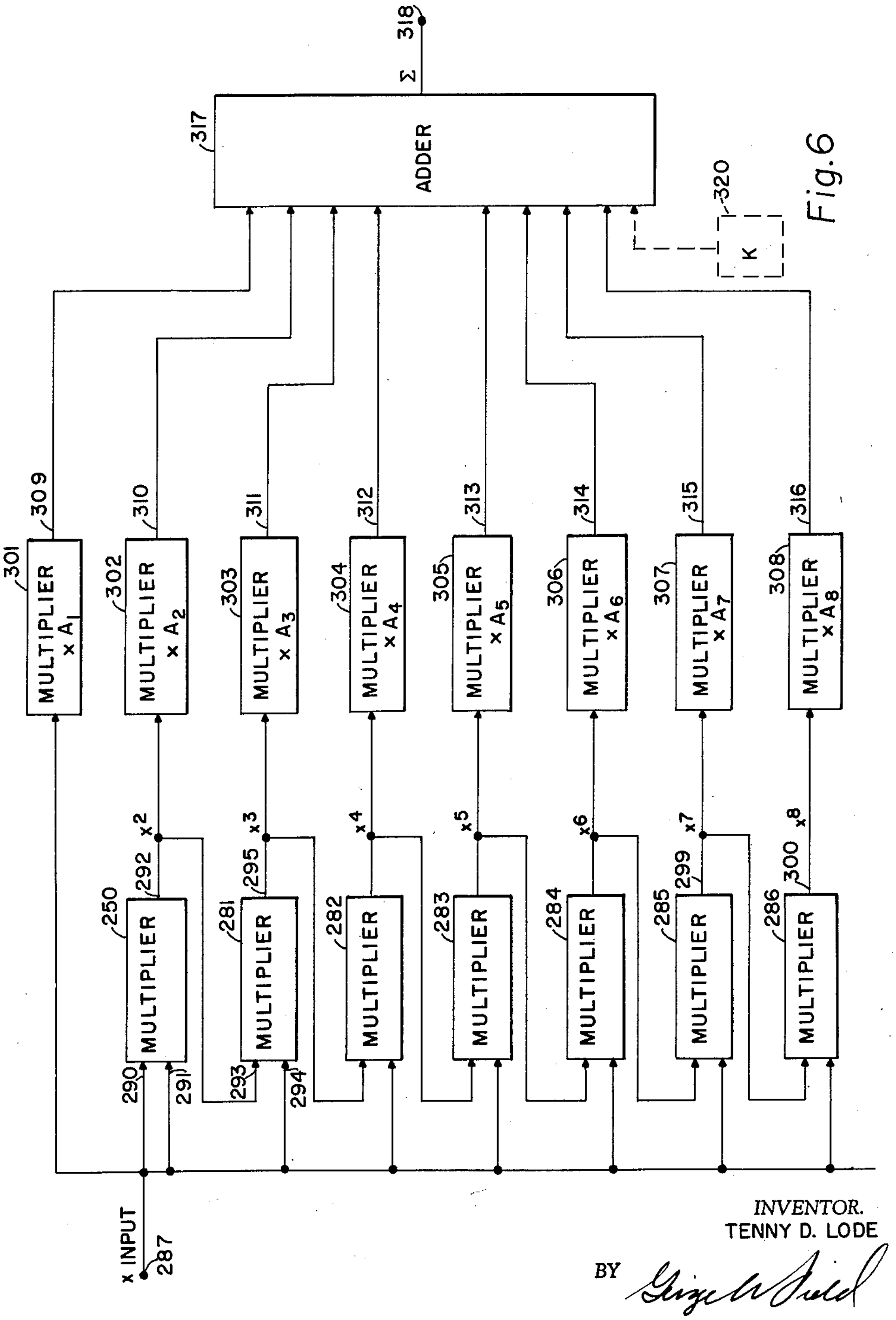

My invention, which combines the above types of computation, takes advantage of both the speed of incremental computation and the accuracy of slower methods by, roughly, correcting the output of an incremental computer periodically with a value obtained through the use of a very accurate computer (using a series expansion for example) and other apparatus. My invention will be more thoroughly understood through reference to the more detailed explanation to follow and the drawings, of which:

FIGURE 1 is a diagram showing a generalization of my invention,

FIGURE 2 is a block diagram of a computer, arranged according to my invention, for computing an exponential function of a variable, FIGURE 3 is a block diagram of a computer, arranged according to my invention, for computing the logarithm of a function, FIGURE 4 is a block diagram of a computer, arranged according to my invention, for computing the sine and cosine of a function, FIGURE 5 is a more detailed block diagram of a portion of the diagram in FIGURE 4, FIGURE 6 is a block diagram of an arrangement for obtaining the sum of a series expansion of a variable.

STRUCTURE OF FIGURE 1

Referring now to FIGURE 1, there is shown an incremental computer 10 having a variable input 11, an output 12 and a correction input 13. A high-accuracy computer 14 has a variable input 15 and a function output 16. Function output 16 is connected to an input 17 of a subtracter 20. There is also a storage delay device 21, which has an input 22 and an output 23. Output 23 of storage device 21 is connected to another input 24 of subtracter 20. Subtracter 20 also has an output 25 connected to switch 26. Another switch 27 is connected between function output 12 of incremental computer 10 and input 22 of storage delay device 21. Still another switch 30 is connected between variable input 11 of incremental computer 10 and variable input 15 of high accuracy computer 14. A timer 31 operates switches 26, 27 and 30. Switch 30 is operated by timer 31 through connection 32, switch 26 is operated through connection 33, and switch 27 is operated by timer 31 through connection 34. A further input 35, labeled "X input," is connected to input 11 of incremental computer 10.

OPERATION OF FIGURE 1

Incremental computer 10 is of the type previously mentioned, which, although capable of very rapid computation, is also subject to cumulative errors over a period of time. More detailed explanation will be given later, but is not necessary, at this point, to understand the general scheme of my invention as shown in FIGURE 1. High-accuracy computer 14 will also be explained in more detail later, but it is sufficient for the present to understand that, while its operation is relatively slow, almost any desired degree of accuracy can be obtained from it.

As stated before, incremental computer 10 is fast enough so that, with a changing $x$ input, the $f(x)$ output may be considered the real time function of the $x$ input, neglecting accumulated errors. With incremental computer 10 operating over relatively long periods of time, however, the accumulated errors in the $f(x)$ output may become so large that the output is no longer usable. It is this difficulty that must be avoided. My invention overcomes the difficulty as follows. Let an $x$ input be applied to input 35 and the entire computer be operating normally. Timer 31 operates switches 30 and 27 simultaneously so that at one instant a sample of the $x$ input is fed to high accuracy computer 14 and at the same instant a sample of the incrementally computed $f(x)$ at output 12 is stored in storage delay device 21. High-accuracy computer 14 now computes the precise or exact value of $f(x)$ from the $x$ sample. This exact $f(x)$ is sent to subtracter 20, where it is compared with the output of storage delay device 21. The output of subtracter 20, then, is the difference between the accurately computed $f(x)$ from the high-accuracy computer 14 and the stored value of $f(x)$. It must be stressed that the sample of the $x$ input from which the exact $f(x)$ was computed and the sample of the incrementally computed $f(x)$ were obtained simultaneously. Therefore, were the incrementally computed $f(x)$ without error, it would equal the exact $f(x)$, and the output of subtracter 20 would be zero. Assuming some error in the incrementally computed $f(x)$, however, that error will now appear at output 25 of subtracter 20. Timer 31 now operates switch 26 to connect subtracter output 25 to correction input 13. Incremental computer 10 is so arranged that output 12 is changed in the amount of the correction appearing at correction input 13, and of course, is increased or decreased according to the sign of the value appearing at correction input 13. This correction being accomplished, the $f(x)$ output of incremental computer 10 is corrected for all errors that existed at the time of sampling the $x$ input and the incrementally computed $f(x)$ output. A complete correction cycle, then, consists of simultaneously sampling the input and output of the incremental computer, computing the exact $f(x)$ of the sampled $x$ input, comparing this exact $f(x)$ with the stored incrementally computed $f(x)$, and transmitting the difference obtained thereby to the incremental computer to change the incremental computer $f(x)$ accordingly. The frequency of the correction cycle is limited, of course, by the time required to perform the series expansion of $f(x)$, or whatever precise method is used to obtain an exact $f(x)$, but the correction cycles may otherwise be timed as desired. Whatever the time between correction cycles, the greatest error ever appearing at the incremental computer's output is that small error accumulated between two successive correction cycles.

For example, when a correction cycle is performed once every second, the incrementally computed $f(x)$ is corrected each second for the error that existed one second previous. Hence the error is reduced to that accumulated in one second, allowed to accumulate for an additional second, and reduced again to the value accumulated in the previous second. In most cases, this is completely negligible.

With the arrangement outlined in FIGURE 1, none of the speed of the incremental computer is lost, but most of the accuracy of the more precise computer 14 is gained. It is apparent then that the best features of both computers have been combined. The result is a device capable of both high speed and great accuracy.

ALGORITHM FOR $e^x$

In performing an incremental computation of a function several algorithms may be used, the one presented below being only representative.

Generally, an incremental computation is performed by changing the computed function by small increments, the value of which is, of course, determined by the corresponding change in the variable.

For example: Let $y=e^x$.

The ratio of the change in $y$ due to a change in $x$ is:

$$\frac{dy}{dx}=e^x=y$$

and $$dy=e^x dx$$

and $$\Delta y=\Delta e^x \cong e^x \Delta x$$

Accordingly, to correct the $e^x$ output for $\Delta x$, a small change in $x$, $e^x \Delta x$ must be added to the present value of $e^x$.

Specifically:

$$e^x{}_{n+1} \cong e^x{}_n + e^x{}_n \Delta x$$

where $e^x{}_{n+1}$ is the incrementally corrected $e^x$,
$e^x{}_n$ is the present $e^x$, and
$\Delta x$ is the incremental change in $x$.

STRUCTURE OF FIGURE 2

FIGURE 2 shows a specific computer arranged according to the scheme of FIGURE 1. The computer in FIGURE 2 gives a real time output which is an exponential function of the input. An input 40 is labeled "$x$ input" and an output 41 is labeled "$e^x$ output." Input 40 is connected to two switches, 42 and 43. The other side of switch 42 is connected to a minuend input 44 of a subtracter 45 and is also connected to an input 46 of a storage delay device 47. The output 50 of storage delay device 47 is connected to the subtrahend input 51 of subtracter 45. Switch 43, which has one side connected to $x$ input 40, has its other side connected to input 52 of series expansion device 53. The output 54 of series expansion device 53 is connected to a minuend input 55 of a substracter 56, which also has a subtrahend input 57 and an output 60. Arithmetic Operations in Digital Computers by R. K. Richards, published by D. Van Nostrand Company, Inc., 1955, chapters 4 and 8 explain various subtracter circuits suitable for use in this invention. Output 60 is connected through a switch 61 to an input 62 of an accumulator 63. Accumulators of the type suitable for use in the practice of this invention are explained in an article titled "Digital Differential Analysis" by Klein, Williams, Morgan and Ochi, published by Instruments and Automation, June, 1957, page 105. Subtracter 45 has its output 64 connected to an input 65 of a multiplier 66, which also has another input 67 and an output 68. The before mentioned reference, Arithmetic Operations in Digital Computers, chapters 5 and 9 explain various multiplier circuits suitable for use in this invention. Output 68 is connected through a switch 70 to another input 71 of accumulator 63. Accumulator 63 has an output 72 which is connected to $e^x$ output 41, to input 67 of multiplier 66, and through a switch 73 to an input 74 of a storage delay device 75. Various types of storage delay circuits can be used in the practice of this invention. A discussion of storage circuits can be found in the above mentioned reference Arithmetic Operations in Digital Computers page 326 through 330, and in Pulse and Digital Circuits by Millman and Taub published by McGraw Hill Book Company Inc. 1956. Storage delay device 75 has an output 76, which is connected to subtrahend input 87 of subtracter 56. Switches 42, 43, 61, 70, and 73 are operated by a timer 77. Either an electro-mechanical or electronic timer could be used in this invention. The Design of Switching Circuits by Keister, Ritchie and Washburn, published by D. Van Norstrand Company Inc., 1951, chapter 17 explains the construction of various types of timers. Connections 80, 81, 82, 83, and 84 operate respectively switches 42, 43, 61, 70, and 73.

OPERATION OF FIGURE 2

Referring now to FIGURE 2 it will be seen how the above algorithm is performed. Assume the entire computer is operating normally. To get a value of $\Delta x$ switch 42 is operated at set intervals by a timer 77. This connects $x$ input 40 periodically to minuend input 44 and storage delay input 46. Storage delay device 47 is arranged so that the $x$ sample present to its input 46 is delayed by the amount of one switching time of switch 42, so that the $x$ sample appearing at storage delay output 50 is always one step behind the $x$ sample presented to input 44 of subtracter 45. With this arrangement, every time an $x$ sample appears at input 44 the immediately preceding $x$ sample appears at input 51 of subtracter 45. The difference between these consecutive $x$ samples is, of course, the change in $x$, $\Delta x$, that occurred between the times of taking the two samples. This difference is found by subtracter 45, so that its output 64 presents the value $\Delta x$ for each sample taken by switch 42. Switch 42 normally operates quite rapidly; for example, in one embodiment 30 samples per second were taken.

Now that $\Delta x$ is available, it must be multiplied by the present value of $e^x$, according to the relation above. In FIGURE 2 output 64 of subtracter 45 is connected to input 65 of multiplier 66. This introduces the $\Delta x$ values to multiplier 66. The $e^x$ output at output 72 of accumulator 63 is connected to another input 67 of multiplier 66, so that this $e^x$ is multiplied by $\Delta x$ therein, and the value $e^x \Delta x$ appears at output 68 of multiplier 66. As switch 70 is closed by timer 77, the increment $e^x\Delta x$ is presented to input 71 of accumulator 63 and is added to the present $e^x$ output, thereby modifying the $e^x$ output by the proper amount, determined by the incremental change in $x$ input. The timer 77 synchronizes switch 70 with switch 42 so that switch 70 is closed once for every closing of switch 42, but delayed by the short time required for operation of subtracter 45 and multiplier 66. Since samples of the $x$ input are taken at frequent intervals, the $e^x$ output keeps pace with changes in the $x$ input, so that the computations performed are of the real time variety.

As in FIGURE 1, the correction arrangement of FIGURE 2 takes simultaneous samples of the $x$ input and the $e^x$ output. The $e^x$ output sample is stored during the time that a precise $e^x$ value is computed from the sampled $x$ input, the stored $e^x$ value is subtracted from the precise $e^x$ value, and the difference is added into the accumulator to correct the $e^x$ output for all error contained therein before the correction sampling. In FIGURE 2 this is accomplished by simultaneously closing switches 43 and 73 so than an $x$ input sample is introduced to the series expansion device 53 at exactly the same time that the $e^x$ output sample is stored by storage delay device 75. Series expansion device 53 then computes an exact value of $e^x$ for the $x$ sample. This exact value is designated in FIGURE 2 as $e^x$ appearing at output 54 of series expansion box 53 and is presented to minuend input 55 of subtracter 56 where it has subtracted from it the stored output value, $e^x{}_s$. The output 60 of subtracter 56, $e^x - e^x{}_s$, is sent to accumulator 63 upon the appropriately timed closing of switch 61, thereby completing one correction cycle. It is to be noted that this correction cycle corrects the $e^x$ output for any error that was present at the time of the correction sampling. The correction cycles are performed at a considerably slower rate than the incremental modification cycles, for the determination of the very accurate value accomplished by the series expansion device requires a relatively long time. In one embodiment, for example, the incremental sampling took place at 30 times per second, while the correction sampling occurred once per second. Nevertheless, the accumulated error during one second is negligible, so that the $e^x$ output is always extremely accurate.

ALGORITHM FOR $\text{Log}_e\ x$

The algorithm used in the incremental computation of $\text{Log}_e\ x$ is derived as follows: Let $y = \text{Log}_e\ x$ then $$dy = \frac{dx}{x}$$

and $$\Delta y \cong \frac{\Delta x}{x}$$

Since $y = \text{Log}_e\ x$, the $\text{Log}_e\ x$ output must change by $$\frac{\Delta x}{x}$$

for each $\Delta x$ change of input.

The manner in which this is accomplished is explained in connection with FIGURE 3.

STRUCTURE OF FIGURE 3

FIGURE 3 is an arrangement quite similar to that shown in FIGURES 1 and 2, but is arranged for the real time computation of $\text{Log}_e\ x$. An $x$ input 90 is connected to one side of a switch 91, the other side of which is connected to a minuend input 92 of a subtracter 93 and is also connected to an input 94 of a storage delay device 95 and to an input 96 of a divider 97. The $x$ input 90 is also connected to one side of a switch 100, the other side of which is connected to the input 101 of a series expansion device 102. The output 103 of series expansion box 102 is connected to the minuend input 104 of subtracter 105, which also has a subtrahend input 106 and a difference output 107. Output 107 is connected through a switch 110 to an input 111 of an accumulator 112. Storage delay device 95 has an output 113 connected to the subtrahend input 114 of subtracter 93, the output 115 of subtracter 93 is connected to an input 116 of divider 97. Output 117 of divider 97 is connected through switch 120 to an input 121 of accumulator 112. The output 122 ($\text{Log}_e\ x$ output) of accumulator 112 is connected through switch 123 to the input 124 of a storage delay device 125, which has its output 126 connected to input 106 of subtracter 105. A timer 127 operates switches 91, 100, 110, 120, and 123, respectively, through connections 130, 131, 132, 133, and 134.

OPERATION OF FIGURE 3

As was mentioned, the operation of FIGURE 3 is very similar to the operation already explained of FIGURES 1 and 2, a difference lying in the algorithm used in the incremental computation of $\text{Log}_e\ x$.

In FIGURE 3, $\Delta x$ is obtained the same way it is in FIGURE 2. This is through the successive sampling of the $x$ input by switch 91 and subtracting of the present sample from the just previous sample in subtracter 93, whose output 115 presents $\Delta x$. This $\Delta x$ is divided by $x$ in divider 97, according to the above algorithm. The value $\Delta x$ appearing at output 117 of the divider 97 is then fed to input 121 through switch 120, which is appropriately synchronized with switch 91 as explained before in connection with FIGURE 2. The output 122 of accumulator 112 is, in this way, modified appropriately with each input sample according to the incremental change of the $x$ input between sampling periods. The $\text{Log}_e\ x$ output of FIGURE 3 is, of course, subject to the same errors mentioned before. It is also corrected in the same manner explained before.

In FIGURE 3, switches 100 and 123 are operated by timer 127 to take simultaneous samples of the $x$ input and $\text{Log}_e\ x$ output, the latter of which is stored in the storage delay device 125 and the former of which is used in the series expansion device 102 to obtain a precise value of $\text{Log}_e\ x$. The precise value is designated $\text{Log}_e\ x$ and the stored sampled value of $\text{Log}_e\ x$ is designated $(\text{Log}_e\ x)s$. As before, the stored value is subtracted from the precise value, in subtracter 105, and the difference is sent through a switch 110 to the input 111 of accumulator 112 where it is added to the $\text{Log}_e\ x$ output. The output is thereby corrected for all error appearing therein at the time of the correction sampling. The correction sampling may take place at whatever speed desired within the limitations of the speed of the series expansion process in series expansion device 102.

ALGORITHMS FOR SINE AND COSINE

To determine what incremental modification must be made of a cosine $\theta$ output for incremental changes in the $\theta$ input. Let $$y = \cos\theta$$

then $$dy = \sin\theta d\theta$$

and $$\Delta y \cong -\theta\Delta\theta$$

To incrementally compute $\cos\theta$, then, the computer must add to the present cosine $\theta$ output a value $-\sin\theta\Delta\theta$ for each $\Delta\theta$ increment.

The incremental computation of $\sin\theta$ is very similar. Let $$y = \sin\theta$$

then $$dy = \cos\theta d\theta$$

and $$\Delta y \cong \cos\theta\Delta\theta$$

Therefore the $\sin\theta$ output must be changed by an amount equal to $\cos\theta\Delta\theta$ for each $\Delta\theta$ increment of the input. The computer of FIGURE 4, as is explained below, accomplishes this in a fashion very similar to those arrangements already explained in connection with FIGURES 1, 2, and 3.

STRUCTURE OF FIGURE 4

FIGURE 4 shows an arrangement by which both sine and cosine outputs are obtained from an angular input. FIGURE 4 is, in a sense, a double computer, one half computing the sine output and the other half computing the cosine output. A $\theta$ input 140 is connected through three switches 141, 142, and 143 to an input 144 of a cosine series expansion device 145, to an input 146 of a storage delay device 147, and to an input 150 of a sine series expansion device 151, respectively. The minuend input 152 of a subtracter 153 is also connected to input 146 of storage delay device 147. Subtracter 153 also has a subtrahend input 154, which is connected to output 155 of storage delay device 147. The output 156 of subtracter 153 is connected to an input 157 of a multiplier 160 and is also connected to an input 161 of a negative multiplier 162. The term "negative multiplier" means that its output is opposite in sign to the actual product of its inputs. Another input 163 of negative multiplier 162 is connected to the output 164 of a sine accumulator 165, the output 166 of negative multiplier 162 is connected through a switch 167 to an input 170 of a cosine accumulator 171. The output 172 of cosine accumulator 171 is connected to output 173, which is labeled "cosine $\theta$ output" and is also connected to an input 174 of multiplier 160. Output 172 is further connected through a switch 175 to the input 176 of a storage delay device 177. The output 180 of storage delay device 177 is connected to the subtrahend input 181 of a subtracter 182, which also has a minuend input 183 connected to the output 184 of cosine series expansion device 145. The output 185 of subtracter 182 is connected through a switch 186 to an input 187 of cosine accumulator 171.

Multiplier 160 has its output 190 connected through a switch 191 to an input 192 of sine accumulator 165. Sine accumulator 165 has a further input 193 connected through a switch 194 to the output 195 of a subtracter 196. Subtracter 196 has a subtrahend input 197 connected to the output 200 of a storage delay device 201, the input 202 of which is connected through a switch 203 to output 164 of sine accumulator 165. Sine $\theta$ output 164 is also connected to output 204. Subtracter 196 has a minuend input 205 connected to the output 206 of sine series expansion device 151.

Connections 210, 211, 212, 213, 214, 215, 216, 217, and 218 of timer 207 which control, respectively, switches 141, 142, 143, 175, 186, 167, 191, 194, and 203.

OPERATION OF FIGURE 4

As was noted, in the incremental computation of the sine $\theta$ output there is need for the cosine $\theta$ value and in the incremental computation of the cosine $\theta$ output the sine $\theta$ value is needed. As a result, the arrangement shown in FIGURE 4 is a rather happy combination.

With the arrangement of FIGURE 4 in normal operation, the $\theta$ input at 140 is sampled periodically through switch 142. The samples are presented directly to minuend input 152 of subtracter 153 and are also sent through storage delay device 147 to the subtrahend input 154 of subtracter 153. Thus, subtracter 153 subtracts the delayed sample of $\theta$ from the present sample of $\theta$ and presents in its output 156 the value $\Delta\theta$, the incremental change of the $\theta$ input that occurs between two successive samplings. $\Delta\theta$ is sent both to the negative multiplier 162 of the cosine section of FIGURE 4 and to multiplier 160 of the sine section of FIGURE 4. Each section performs its respective algorithm as outlined above.

To perform the sine computation cos $\theta$ from the cosine $\theta$ output is sent to multiplier 160, which therefore multiplies $\Delta\theta$ by cos $\theta$ giving as a product the change in sin $\theta$ corresponding to the change in the $\theta$ input. This sin $\theta$ increment is labeled $\Delta$ sine $\theta$ at output 190 of output 160. $\Delta$ sine $\theta$ is transmitted through switch 190 to input 192 of sine accumulator 165, thereby modifying the sine $\theta$ output in accordance with the above algorithm.

To perform the cosine algorithm, $\Delta\theta$ and sin $\theta$ are multiplied by negative multiplier 162, so that its output 166 presents $\Delta$ cos $\theta$, the change in cos $\theta$ corresponding to the change in the $\theta$ input. $\Delta$ cos $\theta$ is fed through switch 167 to the cosine accumulator 171 and is added to the cosine $\theta$ output therein. The cosine $\theta$ output is therefore modified correctly in accordance with the algorithm explained above.

The periodic correction of the sine $\theta$ output and the cosine $\theta$ output of FIGURE 4 is substantially the same as that explained before. For the correction of the sine $\theta$ output, the $\theta$ input and the sine $\theta$ output are simultaneously sampled by the operation of switches 143 and 203, respectively. The sampled sine $\theta$ value is stored in storage delay device 201, a sine series expansion is performed on the $\theta$ sample by series expansion device 151, and the stored sine $\theta$ is subtracted from the precisely computed value in subtracter 196. The difference is then sent, by operation of switch 194, to sine computer 165, wherein it is added to the incrementally computed sine $\theta$ output, thus correcting the sine $\theta$ output for all error present at the time of the correction sampling. This correction cycle is repeated as frequently as desired, tempered, of course, by design considerations.

The cosine correction cycle is identical with the sine correction cycle, except that series expansion device 145 performs the series expansion of the cosine, where series expansion device 151 performs the series expansion of the sine of the $\theta$ sample. The computer of FIGURE 4 therefore, produces real time sine $\theta$ and cosine $\theta$ outputs, which are incrementally computed and periodically corrected to present a very high degree of accuracy.

FIGURES 5 AND 6

FIGURE 5 shows an arrangement for obtaining the sine of an angle by means of a series expansion, and FIGURE 6 outlines a more general arrangement for obtaining functions of a variable by means of series expansions.

The expansion of sine $\theta$, according to Maclaurin's series is $$\text{sine}\, x = x - \frac{x^3}{3!} + \frac{x^5}{5!} - \frac{x^7}{7!} + \ldots$$

From this it can be seen that since $\theta$ can be computed by obtaining the odd powers of $\theta$, multiplying these powers by appropriate constants, and adding all of the terms.

In FIGURE 5, a $\theta$ input 230 is connected to inputs 231 and 232 of multiplier 233 and to input 234 of multiplier 235 and to input 236 of multiplier 237. Multiplier 233 has an output 240, which is connected to an input 241 of multiplier 235, to input 242 of a multiplier 243, and to an input 244 of a multiplier 245. Multiplier 235 has an output 246 connected to an input 247 of multiplier 243, which in turn has an output 250 connected to an input 251 of multiplier 245. There are three other multipliers, 252, 253, 254. Multipliers 252, 253, 254 have inputs 255, 256, and 257 respectively connected to outputs 246 and 250 and an output 260 of multiplier 245. An adder 261 has inputs 262, 263, 264, and 265 and an output 266. Output 266 is connected to an output terminal 267. Multipliers 237, 252, 253, and 254, respectively, have outputs 270, 271, 272, and 273 which are connected in that order to inputs 262, 263, 264, and 265 of adder 261. No specific type of multiplier or adder are required for the practice of this invention. However, chapters 5 and 9 of the before mentioned reference Arithmetic Operations in Digital Computers show various multipliers suitable for use in this invention, while the chapters 4 and 8 discuss various suitable adder circuits.

Multiplier 233 multiplies $\theta$ by $\theta$ giving a $\theta^2$ output 240. This $\theta^2$ is fed to input 241 of multiplier 235, where it is multiplied again by $\theta$, from the other input 234, yielding $\theta^3$. In the same manner, $\theta^3$ is multiplied by $\theta^2$ in multiplier 234, giving $\theta^5$ which is also multiplied by $\theta^2$ in the next multiplier 245, yielding $\theta^7$.

Multiplier 237 multiplies its input by the factor $A_1$, which in the case of the sine $\theta$ expansion is simply plus 1. Multiplier 252 multiplies its input by factor $A_2$. Since the input to multiplier 252 is $\theta^3$, the factor $A_2$ equals $$\frac{-1}{3!}$$

Multiplier 253 multiplies $\theta^5$ by a factor $A_3$, which, to match the series above, is $$\frac{1}{5!}$$

and in a similar fashion $\theta^7$ is multiplied by a factor $A_4$ in multiplier 254, where $A_4$ equals $$\frac{-1}{7!}$$

The outputs of multipliers 237, 252, 253, and 254 are added in adder 261, which then gives as its output a very close approximation of sine $\theta$. The accuracy of this approximation may be increased by any desired amount simply by adding more multipliers to the arrangement of FIGURE 5 so as to include more of the terms in the basic sine expansion given above. In certain instances, expansions other than the Maclaurin series described above may be employed to advantage in a similar manner.

FIGURE 6 shows an arrangement which may be utilized quite generally in obtaining values of functions by series expansions. A cascade of multipliers 280, 281, 282, 283, 284, 285, and 286 are arranged to produce outputs of the powers of $x$ from $x^2$ to $x^8$. The $x$ input 287 is connected to both inputs 290 and 291 of multiplier 280, so that the output 292 of multiplier 280 is $x^2$. This $x^2$ output is connected to an input 293 of multiplier 281, which also has another input 294 connected to $x$ input 287, so that the output 295 of multiplier 281 is $x^3$. As may be seen by reference to FIGURE 6 this process is continued in the remainder of the multipliers 282, 283, 284, 285, and 286, so that $x^4$, $x^5$, $x^6$, $x^7$ and $x^8$ are available at their respective outputs 296, 297, 298, 299, and 300. A second group of multipliers is arranged to multiply their respective inputs by constant values. These are multipliers 301, 302, 303, 304, 305, 306, 307, and 308. The constant values of these multipliers are labeled $A_1$ through $A_8$, respectively, on FIGURE 6. The outputs of multipliers 301 through 308 are, respectively, 309, 310, 311, 313, 314, 315, and 316, all of which are connected to adder 317, wherein they are added together, the sum being presented at output 318 of adder 317.

The operation of FIGURE 6 is similar to that of FIGURE 5, but more generalized.

The Maclaurin series for cos $x$ is:

$$\cos x = 1 - \frac{x^2}{2!} + \frac{x^4}{4!} - \ldots + \frac{(-1)^n x^{2n}}{(2^n)!} + \ldots$$

Accordingly, to compute cosine $x$ the constants $A_1$ through $A_8$ are adjusted as follows:

$$A_1 = 0$$
$$A_2 = \frac{-1}{2!}$$
$$A_3 = 0$$
$$A_4 = \frac{+1}{4!}$$
$$A_5 = 0$$
$$A_6 = \frac{-1}{6!}$$
$$A_7 = 0$$
$$A_8 = \frac{+1}{8!}$$

It is seen, however, that the output 318 does not take into account the first factor in the series, 1. This, of course, simply requires the addition of the value 1, whereupon it represents an accurate determination of cosine $x$. This value 1 may, if desired, be added directly into adder 317 by means of a constant correction device 320, as shown in dashed lines in FIGURE 6.

The Maclaurin series for $e^x$ is:

$$e^x = 1 + x + \frac{x^2}{2!} + \frac{x^3}{3!} + \ldots \frac{x^n}{+n!} + \ldots$$

The arrangement of FIGURE 6 may therefore be used to obtain $e^x$ by setting constants $A_1$ through $A_8$ as follows:

$$A_1 = 1$$
$$A_2 = \frac{1}{2!}$$
$$A_3 = \frac{1}{3!}$$
$$A_4 = \frac{1}{4!}$$
$$A_5 = \frac{1}{5!}$$
$$A_6 = \frac{1}{6!}$$
$$A_7 = \frac{1}{7!}$$
$$A_8 = \frac{1}{8!}$$

The value 1 may again be introduced to adder 317 by constant correction device 320.

Other basic expansions may be performed by apparatus of FIGURE 6 by adjusting the multiplying factors $A_1$ through $A_8$ according to the series expansions utilized. A short list of such expansions is given on page 349 of Differential and Integral Calculus by Clyde E. Love, Fourth Edition, published by the MacMillan Company in 1947. The series expansion devices of FIGURES 1, 2, 3, and 4 operate as just explained.

While I have shown and explained several arrangements embodying my invention, many changes and modifications of this invention will undoubtedly occur to those who are skilled in the art and I therefore wish to be understood that I intend to be limited by the scope of the appended claims and not by the specific embodiments of my invention which is disclosed herein for the purpose of illustration only.

I claim:

1. Self-correcting computing apparatus comprising: a computer for computing the value of a function of a continuously changing variable, said computer having an input for receiving signals representative of said variable and an output for presenting a continuously computed value of said function; further means for computing a relatively precise value of said function for a sample value of said variable, said further means having an input and an output; a first sampling means connected from the input of said further means to the input of said computer for periodically applying a sample value of said variable to said further means; storage means; second sampling means for periodically connecting the output of said computer with said storage means to store a sample of the output of said computer; means causing said second sampling means to operate simultaneously with said first sampling means; comparison means having an output, and having a first input connected to the output of said further means and a second input connected to said storage means for determining the difference between said relatively precise value and said stored sample of the output of said computer and presenting said difference at the output of said comparison means; and means connecting the output of said comparison means to said computer for modifying the output of said computer in accordance with said difference.

2. Apparatus for correcting for error in incremental computation of a function of a changing variable comprising: means for periodically simultaneously sampling a first signal representing a variable and a second signal representing an incrementally computed function thereof; means for storing the sample of said second signal; means for computing a signal representing relatively exact value of the function from the sample of said first signal; means for comparing the signal representing said relatively exact value with the stored sample of said second signal to determine the difference therebetween; and means for adding said difference to said second signal.

3. Apparatus for continuously computing the value of $e^x$, where $x$ is an independent variable, comprising: input means producing a first signal representative of the value $x$; incremental computing means having an input connected to said input means to receive said first signal and having an output presenting an incrementally computed signal representative of $e^x$; means connected to said input means and to the output of said incremental computing means for sampling periodically and simultaneously said first signal and said incrementally computed signal and storing said incrementally computed signal; further computing means connected to said sampling means for receiving the sample of said first signal and computing therefor a second signal representative of a relatively precise value of $e^x$; means for comparing said second signal with the stored sample of said incrementally computed signal and determining the difference; and means for modifying said incrementally computed signal in accordance with said difference.

4. Self-correcting computing apparatus for continuously computing the value of $e^x$ where $x$ is an independent variable comprising; means producing a signal representative of $x$; means for incrementally computing signal representing $e^x$ from said signal representing $x$; means for periodically and simultaneously sampling the signal representing the value of $x$ and the signal representing the incrementally computed value of $e^x$ and storing the latter; means for computing from the sampled signal representing the value of $x$; a signal representing an exact value of $e^x$; means for comparing the signal representing said exact value of $e^x$ with the stored signal representing the value of $e^x$ and computing the difference therebetween; and means for modifying the signal representing the incrementally computed value of $e^x$ in accordance with said difference.

5. Apparatus for correcting for error in a real time computer comprising: means producing a first signal representing a variable; means producing a second signal representing an incrementally computed function of said variable; means for periodically simultaneously sampling said first signal and said second signal; means for storing the sample of said second signal; further means for computing a signal representing a relatively exact value of the function of the sample of said first signal; means for comparing the signal representing said relatively exact value with the stored sample of said second signal and for determining the difference therebetween; and means for modifying the second signal representing said incrementally computed function in the amount of said difference.

6. Self-correcting computing apparatus for continuously computing the value of sine $\theta$, where $\theta$ is an independent variable, comprising: means producing a signal representing $\theta$; means for incrementally computing a signal representing sine $\theta$; means for periodically and simultaneously sampling the signal representing $\theta$ and the incrementally computed signal representing sine $\theta$ and storing the latter; means for computing from the sampled signal representing $\theta$ a signal representing an exact value of sine $\theta$ by a series expansion method; means for comparing said signal representing an exact value of sine $\theta$ with the stored signal representing sine $\theta$ and computing the difference; and means for modifying the incrementally computed signal representing sine $\theta$ in accordance with said difference.

7. Self-correcting computing apparatus for continuously computing the value of cos $\theta$, where $\theta$ is an independent variable, comprising: means producing a first signal representing $\theta$; means for incrementally computing from said first signal a second signal representing cos $\theta$; means for periodically and simultaneously sampling said first and second signals and storing the latter; means for computing from the sampled value of said first signal a third signal representing an exact value of cos $\theta$ by a series expansion method; means for comparing said third signal with the stored value of said second signal and computing the difference; and means for modifying said second signal in accordance with said difference.

8. Self-correcting computing apparatus comprising: an incremental computer for computing the value of a function of a continuously changing variable, said incremental computer having an input for receiving signals representative of said variable and an output for presenting signals representing an incrementally computed value of said function; further means for computing a signal representing a relatively precise value of said function of a sample value of the signal representing said variable, said further means having an input and an output; a first sampling means connected from the input of said further means to the input of said incremental computer for periodically applying a sample value of the signal representing said variable to said further means; storage means; second sampling means for periodically connecting the output of said incremental computer with said storage means to store a sample of the output of said incremental computer, said second sampling means operating simultaneously with said first sampling means; comparison means having an output, and having a first input connected to the output of said further means and having a second input connected to said storage means for determining the difference between the signal representing said relatively precise value and said stored sample of the output of said incremental computer; and means for presenting said difference to said incremental computer for modifying the output of said incremental computer in accordance with said difference.

9. Apparatus for correcting for error in a real time computer comprising: means producing a first signal representing a variable; a real time computer receiving said first signal and producing a second signal representing a function of said variable; means for periodically simultaneously sampling said first and second signals; means for storing the sample of said second signal; further means for obtaining a third signal representing a relatively exact value of the function of the sample of said first signal; means for comparing said third signal with the stored sample of said second signal and for determining the difference therebetween; and means for modifying said second signal in the amount of said difference.

References Cited in the file of this patent

FOREIGN PATENTS 705,168 Great Britain ---------- Mar. 10, 1954